US009197645B2

(12) United States Patent
Vikberg et al.

(10) Patent No.: US 9,197,645 B2
(45) Date of Patent: Nov. 24, 2015

(54) DISTRIBUTION OF ACCESS CONTROL INFORMATION IN A NETWORK

(75) Inventors: Jari Vikberg, Järna (SE); Tomas Nylander, Värmdö (SE); Tomas Hedberg, Stockholm (SE); Mats Buchmayer, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 573 days.

(21) Appl. No.: 13/144,666

(22) PCT Filed: Jan. 14, 2009

(86) PCT No.: PCT/SE2009/050022
§ 371 (c)(1),
(2), (4) Date: Jul. 14, 2011

(87) PCT Pub. No.: WO2010/082874
PCT Pub. Date: Jul. 22, 2010

(65) Prior Publication Data
US 2011/0274051 A1    Nov. 10, 2011

(51) Int. Cl.
*H04L 29/06* (2006.01)
*H04W 8/18* (2009.01)
*H04W 12/08* (2009.01)
*H04W 48/02* (2009.01)
*H04W 84/04* (2009.01)

(52) U.S. Cl.
CPC .............. *H04L 63/101* (2013.01); *H04W 8/18* (2013.01); *H04W 12/08* (2013.01); *H04W 48/02* (2013.01); *H04W 84/045* (2013.01)

(58) Field of Classification Search
None
See application file for complete search history.

(56) References Cited

U.S. PATENT DOCUMENTS 6,334,052 B1   12/2001  Nordstrand
2006/0092839 A1*  5/2006  Dunko .......................... 370/230
2008/0244148 A1*  10/2008  Nix et al. ...................... 710/313

(Continued)

FOREIGN PATENT DOCUMENTS

EP      2 117 252 A1    11/2009
JP      2001-513971 A    9/2001

(Continued)

OTHER PUBLICATIONS

Panasonic, T-Mobile, Orange, Support for Manual CSG whitelist update, 3GPP TSG-RAN WG2#64, R2-086191, Nov. 10, 2008, Prague, Czech Republic, 1 page.

(Continued)

*Primary Examiner* — Faruk Hamza
*Assistant Examiner* — Cassandra Decker
(74) *Attorney, Agent, or Firm* — Patent Portfolio Builders, PLLC

(57) ABSTRACT

Methods and systems described herein may provide for the updating, maintenance, and/or transference of a CSG White List that is stored on a user equipment. The CSG White List may be implemented to store information related to the access of CSG cells, such as, for example, femto cells. Additionally, methods and systems described herein may provide for the updating, maintenance, and/or transference of an access control database. The access control database may be stored in one or multiple devices in a communication system. The access control database may be implemented to store information regarding home nodes and which user equipment is allowed to access the femto cell or CSG cell provided by each home node.

15 Claims, 13 Drawing Sheets

(56) References Cited

U.S. PATENT DOCUMENTS

| | | | |
|---|---|---|---|
| 2009/0232019 A1* | 9/2009 | Gupta et al. | 370/252 |
| 2009/0288140 A1* | 11/2009 | Huber et al. | 726/2 |
| 2009/0300357 A1* | 12/2009 | Kumar et al. | 713/171 |
| 2010/0075670 A1* | 3/2010 | Wu | 455/434 |
| 2010/0157850 A1* | 6/2010 | Horn et al. | 370/259 |

FOREIGN PATENT DOCUMENTS

| | | |
|---|---|---|
| WO | WO 98/39940 A2 | 9/1998 |
| WO | WO 2008/081816 A1 | 7/2008 |
| WO | WO 2008/157817 A1 | 12/2008 |

OTHER PUBLICATIONS

Samsung, Home cell "whitelist" handling, 3GPP TSG-RAN WG2 #62bis, R2-083611, Jun. 30, 2008, Warsaw, Poland, 5 pages.

Written Opinion of the International Searching Authority, PCT Application No. PCT/SE2009/050022, Oct. 14, 2009 (20 pages).

International Search Report, PCT Application No. PCT/SE2009/050022, Oct. 14, 2009 (8 pages).

International Preliminary Report on Patentability, PCT Application No. PCT/SE2009/050022, Feb. 24, 2011 (10 pages).

"Digital Cellular Telecommunications System (Phase 2+) (GSM); Universal Mobile Telecommunications System (UMTS); Support of Localized Service Area (SoLSA); Stage 2 (3GPP TS 23.073 version 4.0.0 Release 4); ETSI TS 123 073," ETSI Standards, LIS, Sophia Antipolis Cedex, France; vol. 3-CN4, No. V4.0.0, Mar. 1, 2001.

Ericsson, "Idle State Access Restriction for Home eNB," 3GPP Draft, R2-073415, $3^{rd}$ Generation Partnership Project (3GPP), Mobile Competence Centre, 650, Route Des Lucioles, vol. RAN WG2, No. Athens, Greece, Aug. 14, 2007, 4 pages.

3GPP: "$3^{rd}$ Generation Partnership Project; Technical Specification Group Services and System Aspects; Service Requirements for Home NodeBs and Home eNodeBs: (Release 9)," $3^{rd}$ Generation Partnership Project (3GPP) Mobile Competence Centre, vol. SA WG1, Jul. 25, 2008, 14 pages.

Vodafone Group, "Measurement Control in LTE_ACTIVE State (for CSG Cells)," 3GPP TSG RAN WG2#58bis Orlando, US, Jun. 25-29, 2007, pp. 1-2.

ETSI TS 136 300 V8.0.0, "Universal Mobile Telecommunications System (UMTS); Evolved Universal Terrestrial Radio Access(E-UTRA) and Evolved Universal Terrestrial Radio Access (E-UTRAN); Overall Description; Stage 2," Mar. 1 2007, 84 pages.

3GPP TS 36.300 V8.5.0, "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)," May 1, 2008, pp. 1-134.

* cited by examiner

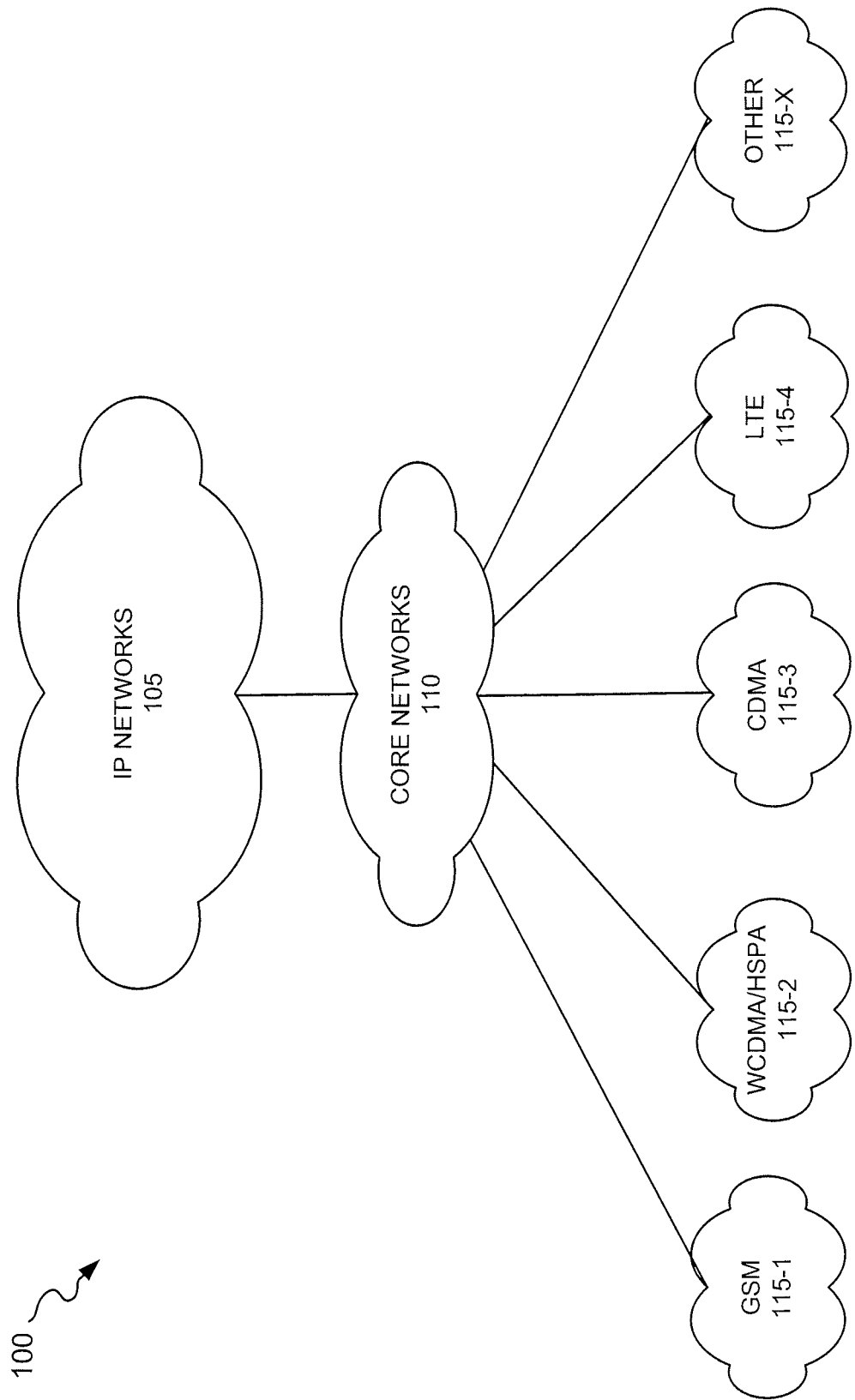

Closed Subscriber Group
(CSG)
White List
240

| CSG ID 245 | ADMIN UE INDICATOR 250 |
|---|---|
|  | YES/NO? |
|  |  |
|  |  |

Access Control
Database
330

| CSG ID 335 | ADMIN UE 340 | ALLOWED USERS 345 |
|---|---|---|
|  |  |  |
|  |  |  |
|  |  |  |

DISTRIBUTION OF ACCESS CONTROL INFORMATION IN A NETWORK

CROSS REFERENCE TO RELATED APPLICATIONS

This application is a 35 U.S.C. §371 national stage application of PCT International Application No. PCT/SE2009/050022, filed on 14 Jan. 2009, the disclosure and content of which is incorporated by reference herein in its entirety. The above-referenced PCT International Application was published in the English language as International Publication No. WO 2010/082874 A1 on 22 Jul. 2010.

TECHNICAL FIELD

Implementations described herein relate generally to communication systems. More particularly, implementations described herein relate to schemes for distributing access control information in the communication system.

BACKGROUND

Specification is ongoing in 3rd Generation Partnership Project (3GPP) for home nodes in the Wideband Code Division Multiple Access/Universal Mobile Telecommunications System (UMTS) Terrestrial Radio Access Network (WCDMA/UTRAN) and in the Evolved Universal Terrestrial Radio Access Network (EUTRAN). In a EUTRAN environment, the home node may be referred to as a home E-UTRAN NodeB (HeNB). In a UTRAN environment, the home node may be referred to as a home NodeB (HNB). The home node may include a home base station that would provide coverage for the end users and would be connected to the core network using some kind of Internet Protocol (IP)-based transmission. The radio coverage provided is called a femto cell. One of the main drivers for this type of local access is to provide cheaper call or transaction rates/charges when connected via the home node versus other nodes (e.g., eNodeB or NodeB).

The home node would, in most cases, utilize the end user's already existing broadband connection (e.g., cable, any DSL based method denoted as x Digital Subscriber Line (xDSL) family of technologies where Asymmetric Digital Subscriber Line (ADSL) is currently the most common one) to achieve connectivity to the operator's mobile core network and possibly to other nodes (e.g., eNodeB, NodeB, home node). Current 3GPP discussions include possibilities to perform access control in a network having femto cells. For example, discussions address the case when neither the user equipment (UE) nor the core network is allowed to be modified (i.e., how to support legacy pre-Release 8 UEs that do not support the closed subscriber group (CSG) concept). In the System Architecture Evolution/Long Term Evolution SAE/LTE 3GPP Rel-8 standards, a concept known as a CSG has been introduced. With the CSG, particular HeNBs can be associated with certain UEs, where only these associated UEs are allowed to access certain HeNBs. It will be appreciated that the CSG is actually associated with a group of subscribers rather than UEs, but for purposes of discussion, the term UE will often be used as the entity of which the CSG is formed. The allowed CSG Identities (CGS-IDs) are stored in the UE in a CSG White List. Each HeNB broadcasts, in system information, both a CSG indicator and the CSG-ID allocated to it. In this way, the UE can determine, by reading the CSG-ID from the system information and comparing this to the content of the CSG White List, whether it is allowed to access a particular HeNB. The allowed CSGs for the UE are also stored in the core network so that the core network can perform an ultimate access control (e.g., in case the UE has an outdated CSG White List or misbehaves (e.g., a hacked UE)). This variant of access control is called core network-based access control.

Current discussion also include a radio access network (RAN)-based access control (e.g., in the WCDMA/UTRAN) to support legacy UEs (i.e., UEs without CSG support). In one implementation, the RAN may include an access control database (ACDB). The ACDB may store information regarding the HNBs and which UEs are allowed to access the femto cell or CSG cell provided by each HNB.

While the utilization of the CSG White List appears promising, the transfer of the CSG White list to the UEs is still open in the current discussions. Further, solutions for maintaining the ACDB have still yet to be specified and remain unresolved.

SUMMARY

It is an object to provide solutions relating to the maintenance, updating and/or transference of the CSG White List and the ACDB and/or improve the operability of devices within a communication system.

According to one aspect, a method may be performed in a communication system by a device that is communicatively coupled to the communication system. The communication system may include one or more closed subscriber group (CSG) cells. The method may include searching for the one or more CSG cells, attempting to access the one or more CSG cells, determining whether access to the one or more CSG cells is granted, and updating a CSG White List corresponding to the one or more CSG cells in which access is granted, where the CSG White List indicates to the device which of the one or more CSG cells the device is allowed to access.

According to another aspect, a method may be performed in a communication system by a device that is communicatively coupled to the communication system. The communication system may include one or more CSG cells. The method may include receiving an indication that an access control database has been updated, performing a power cycle to re-attach to the communication system based on the indication, and updating a CSG White List, where the CSG White List indicates to the device the one or more CSG cells the device is allowed to access.

According to yet another aspect, a method may be performed in a communication system that includes one or more CSG cells. The method may include updating an access control database that specifies which of one or more user equipments are allowed to access the one or more CSG cells, informing a device, which is communicatively coupled to one of the one or more user equipments to which the updating of the access control database pertains, of the updating of the access control database, and providing a CSG White List to the one of the one or more user equipments, where the CSG White List indicates to the one of the one or more user equipments the one or more CSG cells that the one of the one or more user equipments is allowed to access.

According to still another aspect, a method may be performed in a communication system that includes one or more CSG cells. The method may include receiving an update for an access control database that specifies which of one or more user equipments are allowed to access the one or more closed CSG cells, where the update is received based on call control signaling that includes an updated portion of a CSG White List that indicates the one or more CSG cells that the one or more user equipments are allowed to access, determining which of the one or more user equipments the update of the access control database pertains, forwarding the call control signaling that includes the updated portion of the CSG White List to the determined one or more user equipments or triggering a new call that includes the updated portion of the CSG White List to the determined one or more user equipments, and disconnecting from the determined one or more user equipments once the updated portion of the CSG White List is received.

According to another aspect, a method may be performed in a communication system by a device that is communicatively coupled to the communication system. The communication system may include one or more CSG cells. The method may include receiving a CSG White List triggered by an access control database having been updated, where the CSG White List indicates the one or more CSG cells that the device is allowed to access, performing measurements to detect the one or more CSG cells, reporting the measurements, receiving a handover message that authorizes a handoff to one of the one or more CSG cells when the one of the one or more CSG cells was included in the reporting, and accessing the one of the one or more CSG cells according to the handover message.

According to yet another aspect, a method may be performed in a communication system by a device that is communicatively coupled to the communication system. The communication system may include one or more CSG cells. The method may include searching for one or more base stations associated with the one or more CSG cells, transmitting access information to one of the one or more base stations, where the access information includes administrative level access information or non-administrative level access information, receiving an access grant to one of the one or more CSG cells or an access denial to one of the one or more CSG cells based on the transmitted access information, and updating a CSG White List when the access grant is received, where the updating of the CSG White List database includes whether the device corresponds to an administrative level device or a non-administrative level device, and where the CSG White List indicates the one or more CSG cells that the device is allowed to access.

According to still another aspect, a method may be performed in a communication system by a device that is communicatively coupled to the communication system. The communication system may include one or more CSG cells. The method may include connecting to an access control database utilizing non-access stratum (NAS) signaling, where the access control database specifies which of one or more user equipments are allowed to access the one or more CSG cells, identifying one of the one or more user equipments to be added or removed from the access control database, and identifying one of the one or more CSG cells to which the one of the one or more user equipments is granted access in correspondence to the one of the one or more user equipments to be added, or identifying the one of the one or more CSG cells to which the one of the one or more user equipments is denied access in correspondence to the one of the one or more user equipments to be removed.

According to yet another aspect, a device capable of operating in a communication system having one or more CSG cells, the device may include a processing system to search for the one or more CSG cells, attempt to access the one or more CSG cells, determine whether access to the one or more CSG cells is granted, and update a CSG White List corresponding to the one or more CSG cells in which access is granted, where the CSG White List indicates to the device which of the one or more CSG cells the device is allowed to access.

According to another aspect, a device capable of operating in a communication system having one or more CSG cells, the device may include a processing system to receive an indication that an access control database has been updated, perform a power cycle to re-attach to the communication system based on the indication, and update a CSG White List that indicates to the device the one or more CSG cells the device is allowed to access.

According to still another aspect, a device capable of operating in a communication system having one or more CSG cells, the device may include a processing system to receive an indication that an access control database has been updated, where the access control database specifies which of one or more user equipments are allowed to access the one or more CSG cells, determine which of the one or more equipments that the updated access control database pertains, and deliver an updated CSG White List to the determined one or more user equipments, where the updated CSG White List indicates to the determined one or more user equipments which of the one or more CSG cells the determined one or more user equipments are allowed to access.

According to yet another aspect, a device capable of operating in a communication system having one or more CSG cells, the device may include a processing system to receive an update for an access control database that specifies which of one or more user equipments are allowed to access one or more CSG cells, where the update is received based on call control signaling that includes an updated portion of a CSG White List that indicates the one or more CSG cells that the one or more user equipments are allowed to access, determine which of the one or more user equipments the update of the access control database pertains, forward the call control signaling that includes the updated portion of the CSG White List to the determined one or more user equipments or trigger a new call that includes the updated portion of the CSG White List to the determined one or more user equipments, and disconnect from the determined one or more user equipments once the updated portion of the CSG White List is forwarded.

According to another aspect, a device capable of operating in a communication system having one or more CSG cells, the device may include a processing system to receive a CSG White List triggered by an access control database having been updated, where the CSG White List indicates the one or more CSG cells that the device is allowed to access, perform measurements to detect the one or more CSG cells, report the measurements, receive a handover message to one of the one or more CSG cells when the one of the one or more CSG cells was included in the reporting, and access the one of the one or more CSG cells according to the handover message.

According to still another aspect, a device capable of operating in a communication system having one or more CSG cells, the device may include a processing system to search for one or more base stations associated with the one or more CSG cells, transmit access information to one of the one or more base stations, where the access information includes administrative level access information or non-administrative level access information, receive an access grant to one of the one or more CSG cells or an access denial to one of the one or more CSG cells based on the transmitted access information, and update a CSG White List when the access grant is received, where the updating of the CSG White List database includes whether the device corresponds to an administrative level device or a non-administrative level device, and where the CSG White List indicates the one or more CSG cells that the device is allowed to access.

According to yet another aspect, a device capable of operating in a communication system having one or more CSG cells, the device may include a processing system to connect to an access control database utilizing non-access stratum (NAS) signaling, where the access control database specifies which of one or more user equipments are allowed to access the one or more CSG cells, identify one of the one or more user equipments to be added or removed from the access control database, and identify one of the one or more CSG cells to which the one of the one or more user equipments is granted access in correspondence to the one of the one or more user equipments to be added, or identifying the one of the one or more CSG cells to which the one of the one or more user equipments is denied access in correspondence to the one of the one or more user equipments to be removed.

BRIEF DESCRIPTION OF THE DRAWINGS

FIG. 1A is a diagram illustrating an exemplary communication system in which the concepts described herein may be implemented;

DETAILED DESCRIPTION

The following detailed description refers to the accompanying drawings. The same reference numbers in different drawings may identify the same or similar elements. Also, the following description does not limit the invention.

The phrase "CSG cell," as used herein, is intended to be broadly interpreted to include, for example, a femto cell, a pico cell, a micro cell, a macro cell, or some other type of CSG configuration.

The concepts described herein relate to a communication system. The communication system is intended to be broadly interpreted to include any type of wireless network, such as a cellular network and/or a mobile network (e.g., Global System for Mobile Communications (GSM), LTE, WCDMA, Ultra Mobile Broadband (UMB), UMTS, Code Division Multiple Access 2000 (CDMA2000), ad hoc networks, High-Speed Packet Access (HSPA), etc.), and a non-cellular network (e.g., Wireless Fidelity (Wi-Fi), Worldwide Interoperability for Microwave Access (WiMax), etc.). In this regard, it will be appreciated that the concepts described herein are not platform dependent and may be implemented within a wide variety of communication systems.

Embodiments described herein may provide a scheme for end users to dynamically update access control information both in the communication system and in a user terminal (e.g., a UE). The embodiments described herein may solve the problems related to identifying users allowed to update the access control information, identifying CSG cells that access control is being maintained for, identifying end users that are allowed to access the CSG cell, maintaining information in the network-based ACDB and in the UE-based CSG White List, as well as provide advantages that necessarily flow therefrom. For example, the UE may avoid performing unnecessary access attempts to a particular CSG cell.

FIG. 1A is a diagram illustrating an exemplary communication system 100 in which the concepts described herein may be implemented. As illustrated, communication system 100 may include Internet Protocol (IP) networks 105, core networks 110, and different radio access networks (RANs), such as, for example, GSM 115-1, WCDMA/HSPA 115-2, CDMA 115-3, LTE 115-4, and other networks 115-X (e.g., time division-synchronous CDMA (TD-SCDMA)). Although not illustrated, communication system 100 may include other types of networks, such as, for example, circuit-switched networks. The connections between RANs 115, core networks 110 and IP networks 105 are exemplary.

Figure 1B:
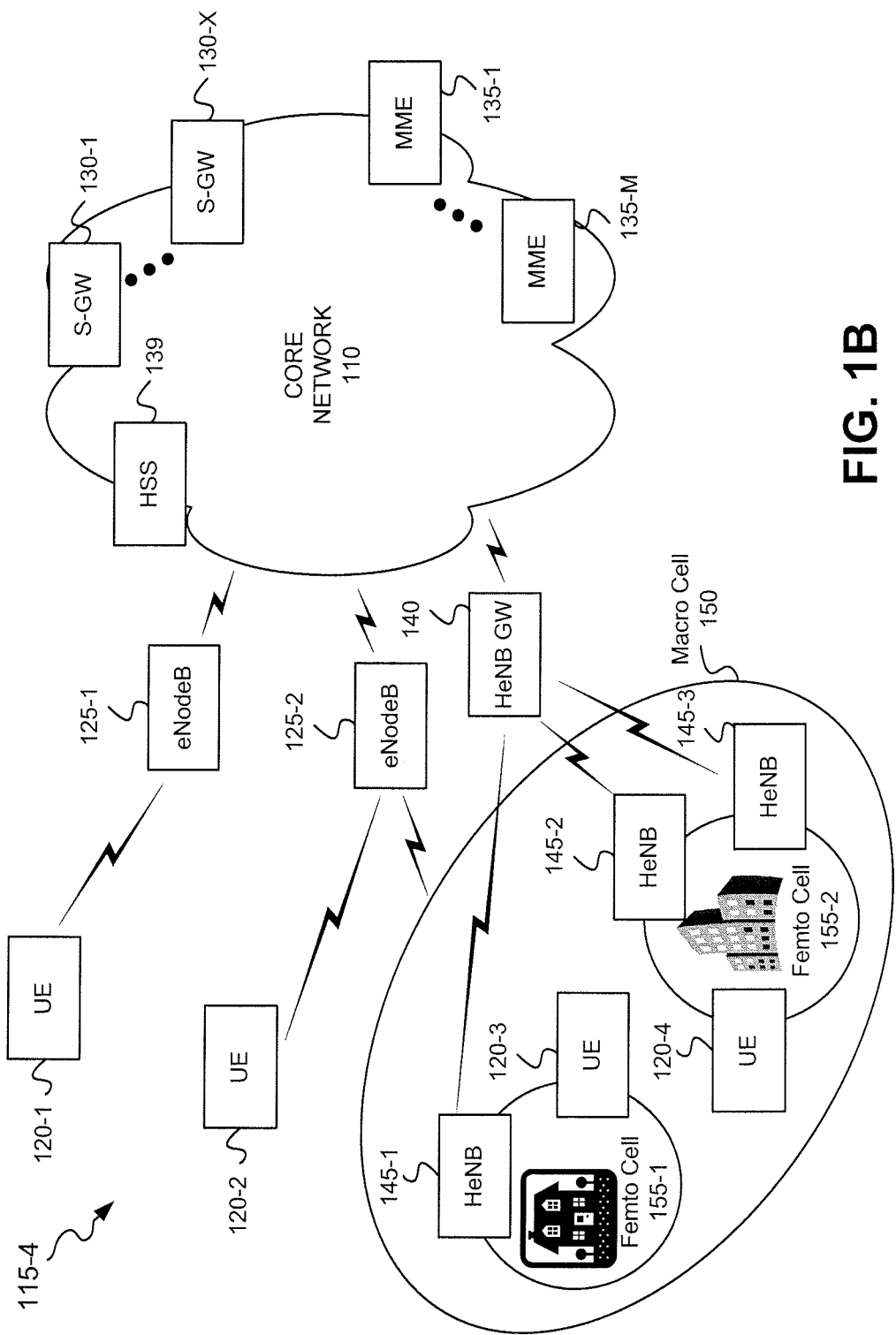
FIG. 1B is a diagram illustrating an exemplary implementation of a LTE network in the communication system of FIG. 1A in which systems and methods may be implemented.

FIG. 1B is a diagram illustrating an exemplary implementation of LTE network 115-4 in communication system 100 in which systems and methods described herein may be implemented. As illustrated in FIG. 1B, LTE 115-4 may include user equipments (UEs) 120-1 through 120-4 (referred to generically as UE 120), E-UTRAN NodeBs (eNodeBs) 125-1 and 125-2 (referred to generically as eNodeB 125), serving gateways (S-GWs) 130-1 through 130-X (referred to generically as S-GW 130), mobility management entities (MMEs) 135-1 through 135-M (referred to generically as MME 135), a home subscriber server (HSS) 139, a HeNB GW 140, and HeNBs 145-1 through 145-3 (referred to generically as HeNB 145). Macro cell 150 and femto cells 155-1 and 155-2 (referred to generically as femto cell 155) may correspond to an area of coverage.

It will be appreciated that the number of devices, the connections between devices, and the macro cell and femto cell arrangements are exemplary. In other implementations, LTE 115-4 may include additional, fewer, or different devices than those illustrated in FIG. 1B. Additionally, in other implementations, the arrangement of devices in FIG. 1B may be different. The connections between the devices illustrated in FIG. 1B may include wired connections and/or wireless connections.

UE 120 may include a device having communication capability. For example, UE 120 may include a wireless telephone, a computer (e.g., a laptop, a palmtop, etc.), a personal digital assistant (PDA), a gaming device, a music playing device, a video playing device, a web browsing device, a personal communication system (PCS) terminal, a pervasive computing device, and/or some other type of portable, mobile, and/or handheld user device. UE 120 may be capable of communicating with one or more devices, networks, etc., illustrated in FIG. 1B.

ENodeB 120, S-GW 130, MME 135, and HSS 139 may include network devices or entities that operate according to one or more versions of the LTE communication standard.

HeNB GW 140 may include a network device that provides access to core network 110. For example, HeNB GW 140 may act as an intermediary node between HeNB 145 and core network 110. HeNB GW 140 may handle various communication issues (e.g., signaling load, security, scaling, etc.) that are associated with the interconnection of HeNB 145 to core network 110.

HeNB 145 may include a network device that provides access to end users to a mobile core network, such as, for example, core network 110, as well as other network devices (e.g., eNodeB 125, HeNB GW 140, etc.). HeNB 145 may extend service coverage to home and business settings where access may be otherwise limited or unavailable. For example, HeNB 145 may include a base station. Macro cell 150 and femto cell 155 correspond to exemplary coverage areas.

Although, FIG. 1B illustrates an exemplary LTE 115-4, it will be appreciated that HeNB 145 and HeNB GW 140 may be incorporated into other wireless networks (e.g., GSM, WCDMA, WiMax, etc.) having a different architecture than LTE.

Figure 2A:
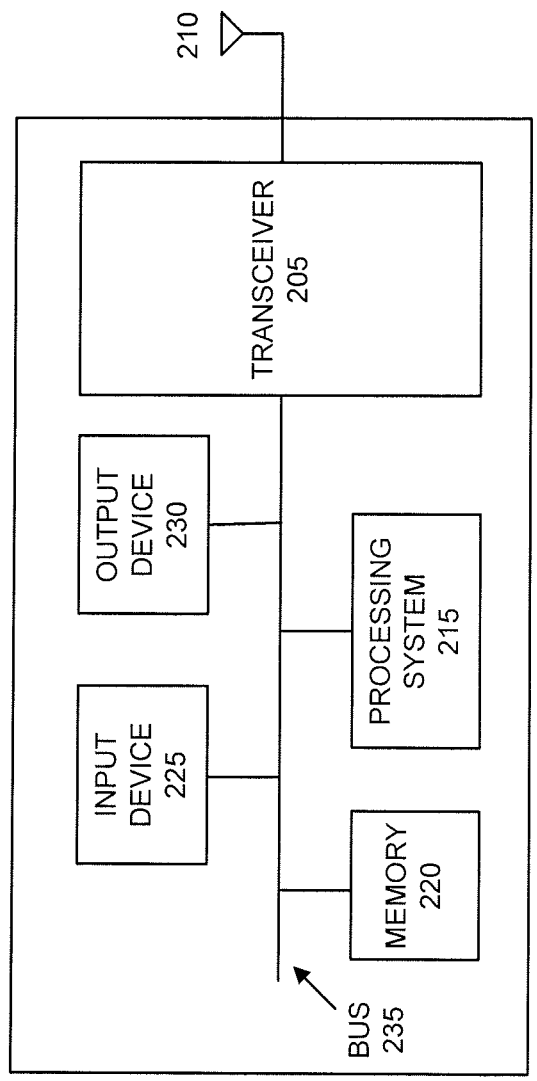
FIG. 2A is a diagram illustrating exemplary components of a UE depicted in FIG. 1B.

FIG. 2A is a diagram illustrating exemplary components of UE 120. As illustrated, UE 120 may include a transceiver 205, an antenna 210, a processing system 215, a memory 220, an input device 225, an output device 230, and a bus 235.

Transceiver 205 may transmit information and receive information over wireless communication links (e.g., radio, microwave, etc.) via antenna 210. Transceiver 205 may perform various communication-related processing, such as, for example, filtering, coding, decoding, modulation, demodulation, signal measuring, multiplexing, demultiplexing, error detection, and/or error correction.

Antenna 210 may receive information and transmit information via wireless communication links. Antenna 210 may include a single antenna system or a multi-antenna system (e.g., a MIMO antenna system). Antenna 210 may provide one or more forms of diversity (e.g., spatial, pattern, or polarization).

Processing system 215 may interpret and/or execute instructions. For example, processing system 215 may include a general-purpose processor, a microprocessor, a data processor, a co-processor, a network processor, an application specific integrated circuit (ASIC), a controller, a programmable logic device, a chipset, and/or a field programmable gate array (FPGA). Processing system 215 may control one or more other components of UE 120. Processing system 215 may perform various communication-related processing, such as, for example, signal processing, channel estimation, power control, and/or timing control, as well as other operations associated with the operation and use of UE 120.

Memory 220 may store information (e.g., data, instructions, applications, etc.). Memory 220 may include volatile memory and/or non-volatile memory. For example, memory 220 may include random access memory (RAM), dynamic random access memory (DRAM), static random access memory (SRAM), read only memory (ROM), programmable read only memory (PROM), erasable programmable read only memory (EPROM), flash memory, and/or some other form of storing hardware. Memory 220 may also include storing hardware that is external to and/or removable from UE 120, such as, for example, a Universal Serial Bus (USB) memory and/or a Subscriber Identity Module (SIM) card.

Input device 225 may receive an input from a user and/or another device. For example, input device 225 may include a keyboard, a keypad, a touchpad, a mouse, a button, a switch, a microphone, a display (e.g., a touch screen), a port, and/or voice recognition logic.

Output device 230 may output information to a user and/or another device. For example, output device 230 may include a display, a speaker, one or more light emitting diodes (LEDs), a vibrator, a port, and/or some other type of visual, auditory, and/or tactile output device. Bus 235 may provide a communication path between components of UE 120.

Although FIG. 2A illustrates exemplary components of UE 120, in other implementations, UE 120 may include fewer, additional, and/or different components than those depicted in FIG. 2A. For example, UE 120 may include a hard disk (e.g., a magnetic disk, an optical disk, a magneto-optic disk), or some other type of computer-readable medium along with a corresponding drive. The term "computer-readable medium," as used herein, is intended to be broadly interpreted to include, for example, a storing medium (e.g., a memory, a hard disk, a compact disc (CD), a digital versatile disk (DVD), etc.). It will be appreciated that one or more components of UE 120 may be capable of performing one or more other tasks associated with one or more other components of UE 120. Additionally, it will be appreciated that the arrangement of components depicted in FIG. 2A may be different in other implementations.

Figure 2B:
FIG. 2B is a diagram illustrating an exemplary CSG White list.
Figure 2B:

FIG. 2B is a diagram illustrating an exemplary CSG White List 240. CSG White List 240 may be stored as any type of data structure (e.g., a table, a list, etc.) or arrangement of data. UE 120 may store CSG White List 240 on a storing medium (e.g., memory 220). As illustrated in FIG. 2B, CSG White List may include a CSG ID field 245 and an Administrator (Admin) UE indicator field 250. UE 120 may refer to CSG White List 240 to determine which CSG(s) it can access.

CSG ID field 245 may include an identifier (e.g., a character string or an unstructured 27 bit identifier) that corresponds to a CSG. For example, a CSG ID may be broadcast as part of system information in a CSG cell (e.g., femto cell 155).

Admin UE Indicator field 250 may include an indicator to identify an administrator level UE. This indicator can be used to enable different logic (e.g., a GUI) in the UE to enable a user to add or remove a UE 120 from the ACDB.

Although FIG. 2B illustrates an exemplary CSG White List 240, in other implementations, CSG White List 240, may include additional, fewer, and/or different informational fields.

Figure 3A:
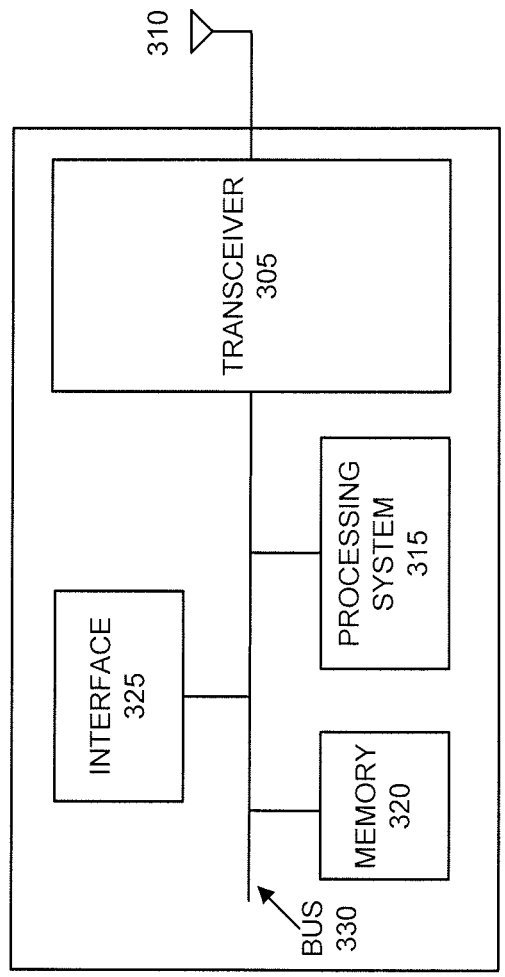
FIG. 3A is a diagram illustrating exemplary components of a Home E-UTRAN NodeB (HeNB) depicted in FIG. 1B.

FIG. 3A is a diagram illustrating exemplary components of HeNB 145. As illustrated, HeNB 145 may include a transceiver 305, an antenna 310, a processing system 315, a memory 320, an interface 325, and a bus 330. It will be appreciated that other devices in LTE 115-4 (e.g., eNodeB 125, S-GW 130, MME 135, HeNB GW 140), may include the same or similar components.

Transceiver 305 may transmit information and receive information over wired connections (e.g., cable, xDSL, etc.) via interface 325 and wireless communication links (e.g., radio, microwave, etc.). Transceiver 305 may perform various communication-related processing, such as, for example, filtering, coding, decoding, modulation, demodulation, signal measuring, multiplexing, demultiplexing, error detection, and/or error correction.

Antenna 310 may receive information and transmit information via wireless communication links. Antenna 310 may include a single antenna system or a multi-antenna system (e.g., a MIMO antenna system). Antenna 310 may provide one or more forms of diversity (e.g., spatial, pattern, or polarization).

Processing system 315 may interpret and/or execute instructions. For example, processing system 315 may include a general-purpose processor, a microprocessor, a data processor, a co-processor, a network processor, an application specific integrated circuit (ASIC), a controller, a programmable logic device, a chipset, and/or a field programmable gate array (FPGA). Processing system 315 may control one or more other components of HeNB 145. Processing system 315 may perform various communication-related processing, such as, for example, modulation, demodulation, error detection, and/or error correction, as well as other operations associated with the operation of HeNB 145.

Memory 320 may store information (e.g., data, instructions, applications, etc.). Memory 320 may include volatile memory and/or non-volatile memory. For example, memory 320 may include random access memory (RAM), dynamic random access memory (DRAM), static random access memory (SRAM), read only memory (ROM), programmable read only memory (PROM), erasable programmable read only memory (EPROM), flash memory, and/or some other form of storing hardware.

Interface 325 may permit HeNB 145 to communicate with other devices, networks, and/or systems. For example, interface 325 may include an Ethernet interface, an optical interface, a coaxial interface, a DSL interface, or the like.

Bus 330 may permit communication between components of HeNB 145.

Although FIG. 3A illustrates an exemplary implementation of HeNB 145, in other implementations, HeNB 145 may include fewer, additional, or different exemplary components than those depicted in FIG. 3A. Additionally, in other implementations, the components may be arranged differently.

Figure 3B:
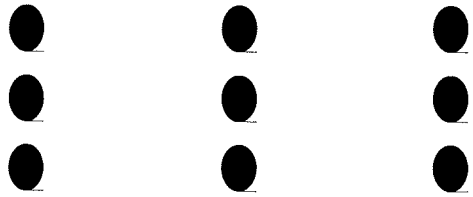
FIG. 3B is a diagram illustrating an exemplary access control database (ACDB)
Figure 3B:

FIG. 3B is a diagram illustrating an exemplary ACDB 330. ACDB 330 may be stored as any type of data structure (e.g., a table, a list, etc.) or arrangement of data. HeNB 145 may store ACDB 330 on a storing medium (e.g., memory 320). As illustrated, ACDB 330 may include a CSG ID field 335, an Admin UE field 340, and an allowed users field 345 for each CSG. In one embodiment, ACDB 330 may store similar information as CSG White List 240 (i.e., a CSG ID, and Admin UE information), as well as additional information (e.g., allowed users).

CSG ID field 335 may include an identifier (e.g., a character string or an unstructured 27 bit identifier) that corresponds to a CSG.

Admin UE field 340 may include an identifier (e.g., a character string) that corresponds to an administrator level UE. The identifier may include, for example, an International Mobile Subscriber Identity (IMSI) or some other unique identifier (e.g., an International Mobile Equipment Identity (IMEI), a Mobile Subscriber ISDN Number (MSISDN), a combination thereof, etc.). A UE identified as having an administrator level may add or remove a UE from allowed users field 345. In this way, a user having administrator access may regulate a CSG. It will be appreciated, however, that there may be more than one Admin UE 120 per CSG. Further, the same Admin UE 120 may regulate multiple CSGs.

Allowed users field 345 may include one or more identifiers (e.g., a character string) that correspond to one or more users. For example, the identifier may include, for example, an IMSI or some other unique identifier (e.g., an IMEI, a MSISDN, a combination thereof, etc.).

Although FIG. 3B illustrates an exemplary ACDB 330, in other implementations, ACDB 330 may include additional, fewer, and/or different informational fields. Further, although ACDB 330 is described in relation to HeNB 145, in other implementation, ACDB 330 may reside in a different node of LTE 115-4 (e.g., HeNB GW 140, MME 135, S-GW 130), or another node (e.g., a home subscriber server (HSS) not illustrated in FIG. 1B) to store the ACDB 330 or a portion thereof. Additionally, or alternatively, ACDB 330, or a portion thereof, may be stored in multiple devices of LTE 115-4.

An exemplary process is described below, in connection with FIG. 4, in which an Admin UE 120 may update ACDB 330. For purposes of discussion, the exemplary process will be described based on communication system 100 depicted in FIG. 1B. However, it will be appreciated that the exemplary process may be performed in communication system 100 depicted in FIG. 1A, in which devices different than those depicted in FIG. 1B may be present. For example, an operation described as being performed by MME 135, may, in a different RAN (e.g., WCDMA/UTRAN), be performed by a different device, such as, for example, a mobile switching center (MSC), a serving GPRS support node (SGSN), etc.

Figure 4:
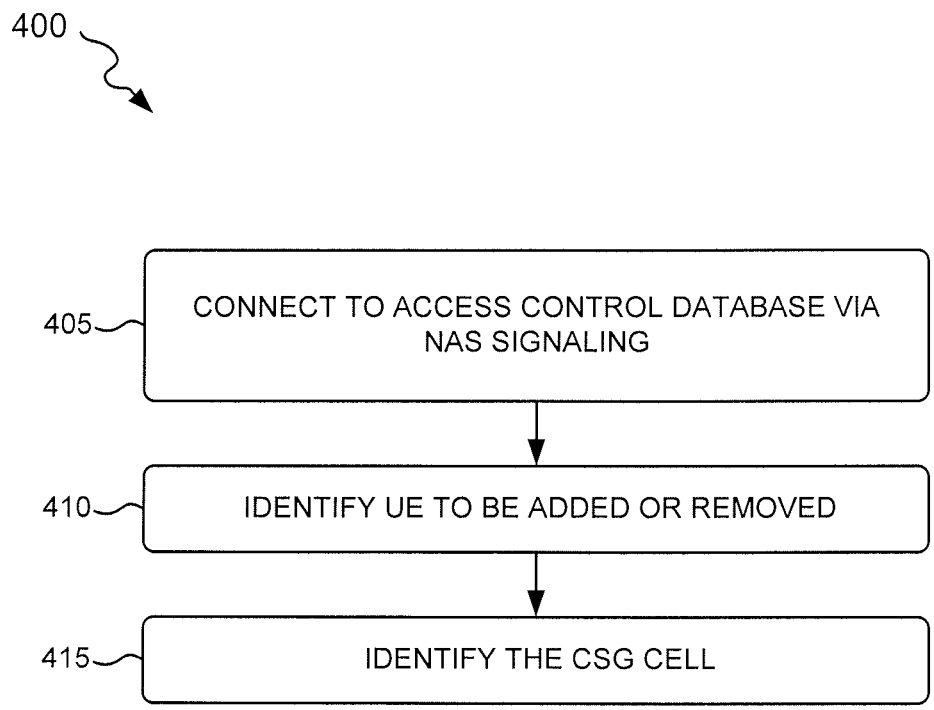
FIG. 4 is a flow diagram illustrating an exemplary process for updating the ACDB.

FIG. 4 is a flow diagram illustrating an exemplary process 400 for updating ACDB 330. The exemplary process 400 may be performed by UE 120 that is identified as an Admin UE 120. For example, LTE 115-4 may authenticate UE 120 as an Admin UE 120 based on a user ID (e.g. IMSI) and/or password during initial connection establishment. In this way, a user may not need to authenticate and/or identify itself as an administrator when accessing and/or managing ACDB 330.

Process 400 may begin with connecting to ACDB 330 via non-access stratum (NAS) signaling (block 405). For purposes of discussion, ACDB 330 may reside on HeNB 145. In other implementations, ACDB 330 may reside on another device in LTE 115-4 (e.g., HeNB GW 140), or another node (not illustrated in FIG. 1B) to store ACDB 330. Admin UE 120 may connect to core network 110 and update ACDB 330 utilizing specific NAS messages. For example, admin UE 120 may provide a user with a graphical user interface (GUI) and enabling of this functionality could be based on the CSG White List contents e.g. that the UE is indicated as Admin UE for any of the CSGs in the CSG White List. The GUI may receive input from the user and admin UE 120 may generate specific NAS signaling and transmit the NAS signaling towards MME 135. MME 135 may map the specific NAS signaling to HeNB 145 (ACDB 330). For example, MME 135 may map new NAS commands as database commands (e.g., as Structural Query Language (SQL) commands) to update ACDB 330. By way of example, a new NAS command could correspond to "ADD CSG USER." In another implementation, MME 135 may route the specific NAS signaling to HeNB 145 (ACDB 330). In this instance, the specific NAS signaling may carry a new application capable of updating the ACDB 330. That is, the new application may provide for the execution of database commands (e.g., SQL commands) so as to update ACDB 330.

A UE to be added or removed may be identified (block 410). Admin UE 120 may add or remove a user from allowed users field 345 of ACDB 330. In one embodiment, when adding a user to allowed users field 345, the user may enter an identifier (e.g., an IMSI) or some other type of identifier (an IMEI, a MSISDN, a combination thereof, etc.) to identify the user to be added. In another embodiment, the user may enter information (e.g., personal information) other than an identifier, which may be subsequently translated to an identifier (e.g., an IMSI, an IMEI, etc.).

A CSG cell may be identified (block 415). Admin UE 120 may identify the CSG, associated with the user being added or removed, in CSG ID field 335. For example, the user may enter a CSG ID that identifies the CSG.

Although FIG. 4 illustrates an exemplary process 400, in other implementations, fewer, additional, and/or different operations may be performed.

The processes described below relate to the updating of CSG White List 240. In this way, a user (or UE 120) may have knowledge of which CSG(s) are accessible. For purposes of discussion, the exemplary process will be described based on communication system 100 depicted in FIG. 1B. However, it will be appreciated that the exemplary process may be performed in communication system 100 depicted in FIG. 1A, in which devices different than those depicted in FIG. 1B may be present. For example, an operation described as being performed by MME 135, may, in a different type of RAN, be performed by a different device, such as, for example, a mobile switching center (MSC), a serving GPRS support node (SGSN), etc. Similarly, an operation described as being performed by eNodeB 125, may, in a different type of RAN, be performed by a different device, such as, for example, NodeB, radio network controller (RNC), a base station controller (BSC), a HNB Gateway (HNB GW), etc.

Figure 5A:
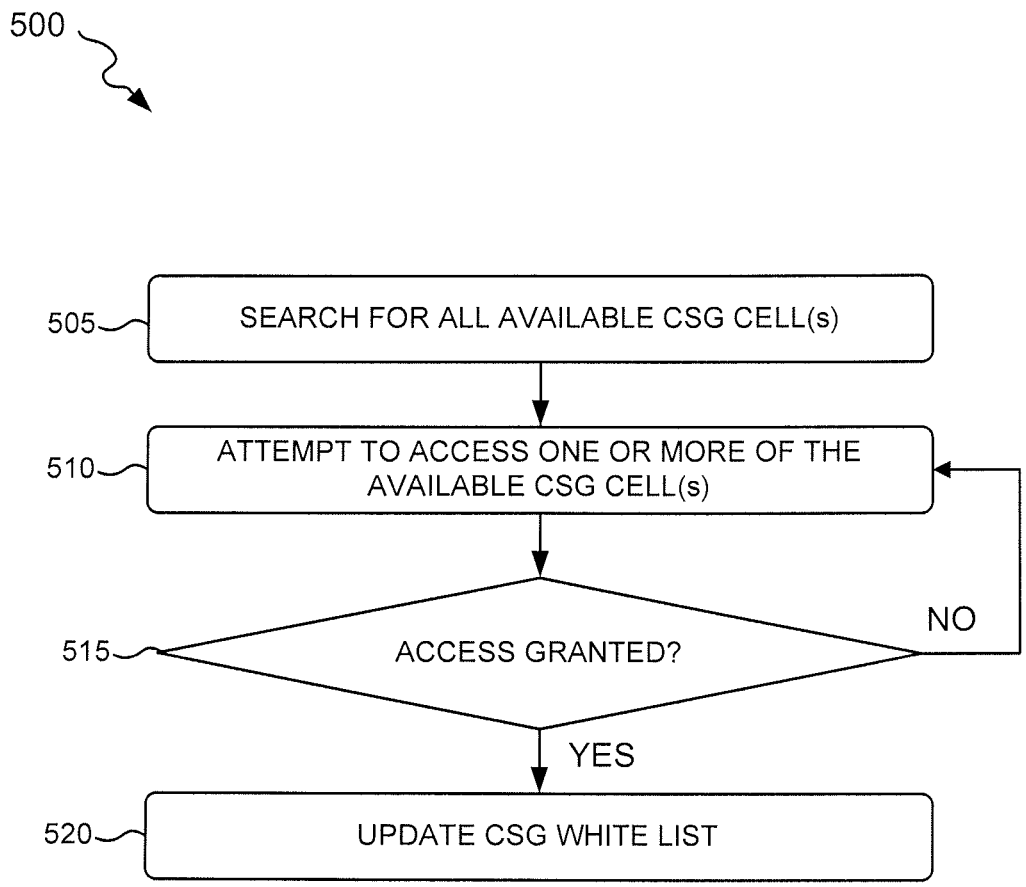
FIGS. 5A-7 are flow diagrams illustrating exemplary processes for updating the CSG White List.

FIG. 5A is a flow diagram illustrating an exemplary process 500 for updating CSG White List 240. Process 500 may be performed by a UE 120 or an admin UE 120. The updating of CSG White List 240 described in process 500 may be a UE-initiated process.

A search for all available CSG cell(s) may be performed (block 505). A user may trigger a search, on UE 120, for all detectable CSG cell(s). It will be appreciated that a detected CSG cell, as a result of the searching, may or may not be included in CSG White List 240, which resides on UE 120.

Access to one or more of the available CSG cell(s) may be attempted (block 510). UE 120 may determine an available CSG cell(s) based on the searching. UE 120 may attempt to access a detected CSG cell. In one implementation, the access attempt may, for example, correspond to a Tracking Area Update towards MME 135. The access attempt may include an identifier of UE 120.

It may be determined whether access is granted (block 515). A CSG cell may provide a response to UE 120. For example, HeNB 145 may generate a response to UE 120 when attempting to access a CSG cell based on a comparison of admin UE field 340 and/or allowed users field 345 of ACDB 330 with the identifier of UE 120. In another implementation, MME 135 may generate a response to UE 120. For example, MME 135 may determine whether access is granted based on a comparison of the identifier of UE 120 with ACDB 330. If it is determined that the response does not permit access to the CSG cell (block 515—NO), then UE 120 may return to block 510 and attempt to access another available CSG cell. UE 120 may also update its CSG White List 240 (e.g., remove a CSG ID corresponding to the attempted access of the CSG cell) in instances when the CSG cell was included in CSG White List 240.

On the other hand, if it is determined that the response permits access to the CSG cell (block 515—YES), then UE 120 may update CSG White List 240 (block 520). For example, UE 120 may receive a response that indicates access to the CSG cell. In the event that CSG White List 240 did not include the accessible CSG cell, UE 120 may update CSG White List 240 (e.g., add a CSG ID). UE 120 may store the updated information in CSG White List 240. In addition, when admin UE 120 updates CSG White List 240, admin UE 120 may add information to admin UE indicator field 250 of CSG White List 240.

Although FIG. 5A illustrates an exemplary process 500, in other implementations, fewer, additional, and/or different operations may be performed. For example, if access to a CSG cell is denied, a CSG Black List could be generated and sent to UE 120. The CSG Black List could include CSG/CSG IDs in which UE 120 is not allowed to access. In this way, UE 120 may not unnecessarily attempt to access CSG cells that it is not allowed to access.

Figure 5B:
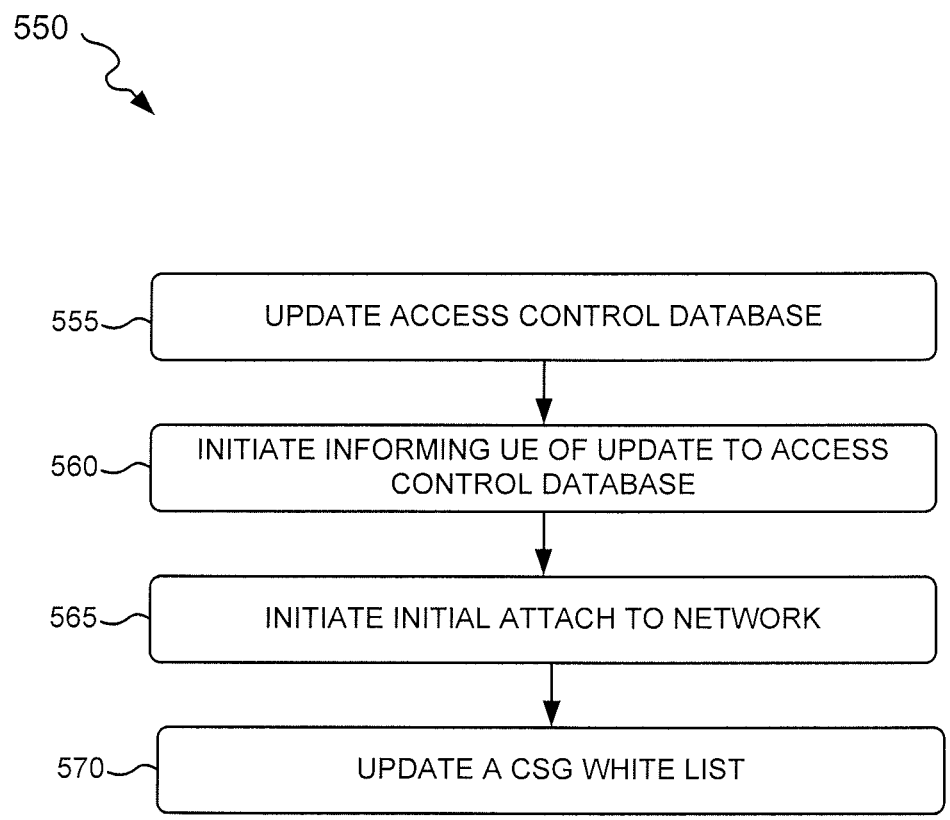

FIG. 5B is a flow diagram illustrating an exemplary process 550 for updating CSG White List 240. The updating described in process 550 may be triggered by an update to ACDB 330.

The ACDB may be updated (block 555). Admin UE 120 may update ACDB 330. For example, the update may include adding and/or removing a particular UE to/from a CSG. In one implementation, by way of example, admin UE 120 may identify a particular UE 120 based on the MSISDN, some other identifier, and/or personal information of user, etc. (which may or may not require conversion), to, for example, an IMSI in a home subscriber server (HSS). The HSS may then uniquely identify the particular UE 120. By way of example, the HSS may include a database. The database may include an association between the IMSI and allowed CSG cells.

Informing the UE of the update to the ACDB may be initiated (block 560). For example, MME 135 may initiate informing the particular UE of the update based on the update to ACDB 330. That is, the update to ACDB 330 may constitute a triggering event to update CSG White List 240. In one implementation, where the particular UE is not attached to the device (e.g., HeNB 145) in which the updated ACDB 330 resides, the device (e.g., HeNB 145) may inform core network 110 (e.g., the HSS) of the update. For example, when UE 120 attaches to MME 135, some subscription information may be sent from the HSS to MME 135, which may include CSG White List 240 (as a part of the subscription information). In turn, MME 135 may be capable of informing the particular UE of the update. In instances when UE 120 is already attached to the device (e.g., HeNB 145) and HSS information is updated, the HSS may push the updated information to MME 135 that may be serving the particular UE 120. In either circumstance, MME 135 may signal to the particular UE 120 that an update to CSG White List 240 exists.

An initial attachment to the network may be initiated (block 565). UE 120 (i.e., the particular UE), having knowledge of the update, may perform a power cycle (e.g., a reboot, a power off and then a power on). For example, if UE 120 is in an idle mode, the power cycle may be automatic. In other instances, if UE 120 is not in an idle mode, a message or warning to the user may be provided. The user may control when the power cycle may occur (e.g., to allow the user to complete a telephone call, etc.). When the power cycle occurs, UE 120 may perform an initial attach to LTE 115-4 (e.g., between UE 120 and MME 135).

The CSG White List may be received (block 570). During the initial attach, MME 135 may transmit an updated portion of CSG White List 240 to UE 120. For example, MME 135 may include the updated portion of CSG White List 240 as a part of the signaling related to the attachment process. UE 120 may then receive and store the updated CSG White List 240.

Although FIG. 5B illustrates an exemplary process 550, in other implementations, fewer, additional, and/or different operations may be performed.

Figure 6A:
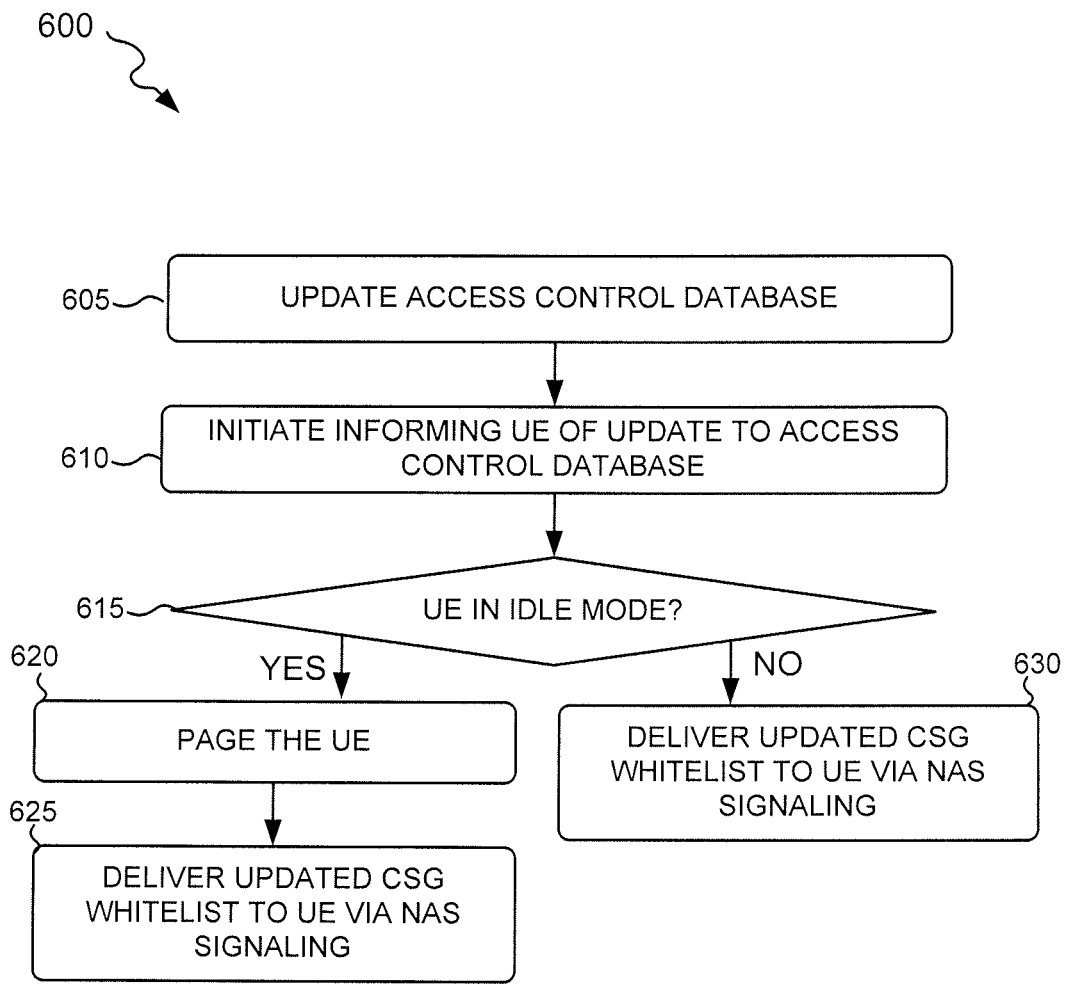

FIG. 6A is a flow diagram illustrating an exemplary process 600 for updating CSG White List 240. The updating described in process 600 may be triggered by an update to ACDB 330, and may utilize NAS signaling.

The ACDB may be updated (block 605). Admin UE 120 may update ACDB 330. For example, the update may include adding and/or removing a particular UE to/from a CSG.

Informing the UE of the update to the ACDB may be initiated (block 610). For example, MME 135 may initiate informing the particular UE of the update based on the update to ACDB 330. That is, the update to ACDB 330 may constitute a triggering event to update CSG White List 240. In one implementation, where the particular UE is not attached to the device (e.g., HeNB 145) in which the updated ACDB 330 resides, the device (e.g., HeNB 145) may inform core network 110 (e.g., the HSS) of the update. For example, when UE 120 attaches to MME 135, some subscription information may be sent from the HSS to MME 135, which may include CSG White List 240 (as a part of the subscription information). In turn, MME 135 may be capable of informing the particular UE of the update. In instances when UE 120 is already attached to the device (e.g., HeNB 145) and HSS information is updated, the HSS may push the updated information to MME 135 that may be serving the particular UE 120.

It may be determined whether the UE is in an idle mode (block 615). For example, MME 135 (or, for example, HeNB 145) may determine whether the particular UE is in an idle mode based on the connection state of UE 120. If it is determined that the UE is in an idle mode (block 615—YES), the UE may be paged (block 620). For example, MME 135 may page UE 120, via eNodeBs 125, as normally to enter connected mode, for example via all eNodeBs serving cells belonging to any of the tracking areas that are part of the UE's 120 current tracking area list.

The updated CSG White List 240 may be delivered to UE 120 via NAS signaling (block 625). MME 135 may transmit an updated portion of CSG White List 240 in a NAS signaling message.

In other instances, if the UE is not in an idle mode (block 615—NO), then the updated CSG White List 240 may be delivered to UE 120 via NAS signaling. That is, when UE 120 is already in connected mode, MME 135 may transmit the updated portion of CSG White List 240 in a NAS signaling message.

Although FIG. 6A illustrates an exemplary process 600, in other implementations, fewer, additional, and/or different operations may be performed.

Figure 6B:
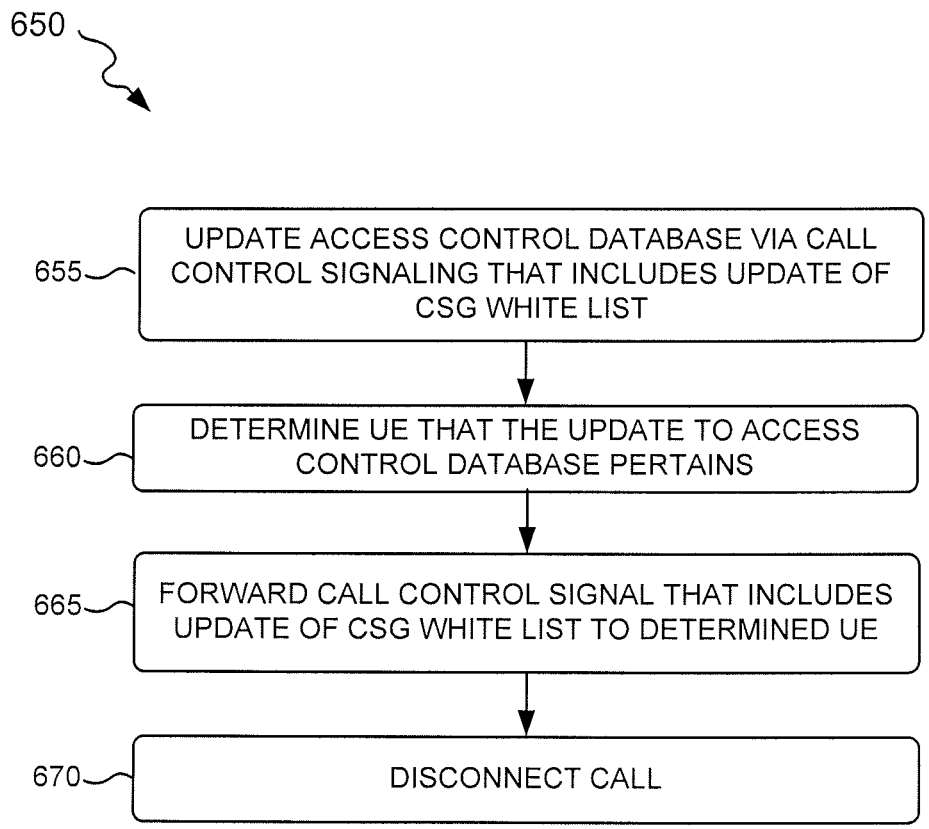

FIG. 6B is a flow diagram illustrating an exemplary process 650 for updating CSG White List 240. The updating described in process 650 may be triggered by call control (CC) signaling from an admin UE 120 to update ACDB 330. In another implementation, the Session Initiated Protocol (SIP) may be utilized as the CC signaling protocol. It will be appreciated that CC signaling may not be utilized in a LTE communication system (as illustrated in FIG. 1B). However, the CC signaling may be utilized in WCDMA RAN 115-2 (as illustrated in FIG. 1A). Further, as mentioned above, communication system 100 may include circuit-switched networks. In such circumstances, CC signaling may be utilized in a circuit-switched network to update ACDB 330 in which a MSC may route update information of ACDB 330.

The ACDB may be updated (block 655). Admin UE 120 may update ACDB 330. For example, as previously described in other processes described herein, an update may include adding a particular UE to a CSG. In one implementation, admin UE 120 may update ACDB 330 utilizing normal call control (CC) signaling toward core network 110. For example, admin UE 120 may utilize a specific prefix and/or B-number to define all of the updated information. By way of example, a user of Admin UE 120 may enter a prefix function, an add or a delete, and a B number (e.g., 6781MSISDN-xyz), where "678" corresponds to a prefix function, "1" corresponds to an add (or "2" corresponds to a delete), and "MSISDN-xyz" corresponds to the B number. It will be appreciated that the order and/or the number of characters may be different. The updated information may include an updated portion of CSG White List 240 (e.g., the updated portion of ACDB 330 that corresponds to CSG White List 240). In one implementation, as previously mentioned, CSG ID information and admin UE information may be information common to both CSG White List 240 and ACDB 330. The updated portion of CSG White List 240 may be included in an optional information element (IE) in the CC signaling. Core network 110 (e.g., a MSC) may route the updated information to ACDB 330.

It may be determined the particular UE to which the update of the ACDB pertains (block 660). For example, the MSC may determine the particular UE 120 that the update of ACDB 330 pertains based on the updated information in the CC signaling (e.g., allowed users field 345).

The call control signaling may be forwarded to the determined UE (block 665). The MSC may forward the CC signaling to the particular UE 120. The updated portion of CSG White List 240 may be forwarded in the optional IE in the CC signaling. In another implementation, the MSC may trigger a new call to the particular UE 120.

The call controlling signaling may be disconnected (block 670). The CC signaling may be disconnected and UE 120 may determine that it received the updated portion of CSG White List 240.

Although FIG. 6B illustrates an exemplary process 650, in other implementations, fewer, additional, and/or different operations may be performed. For example, UE 120 may transmit an acknowledgement to core network 110 (e.g., the MSC) after the CC signaling disconnects.

Figure 7:
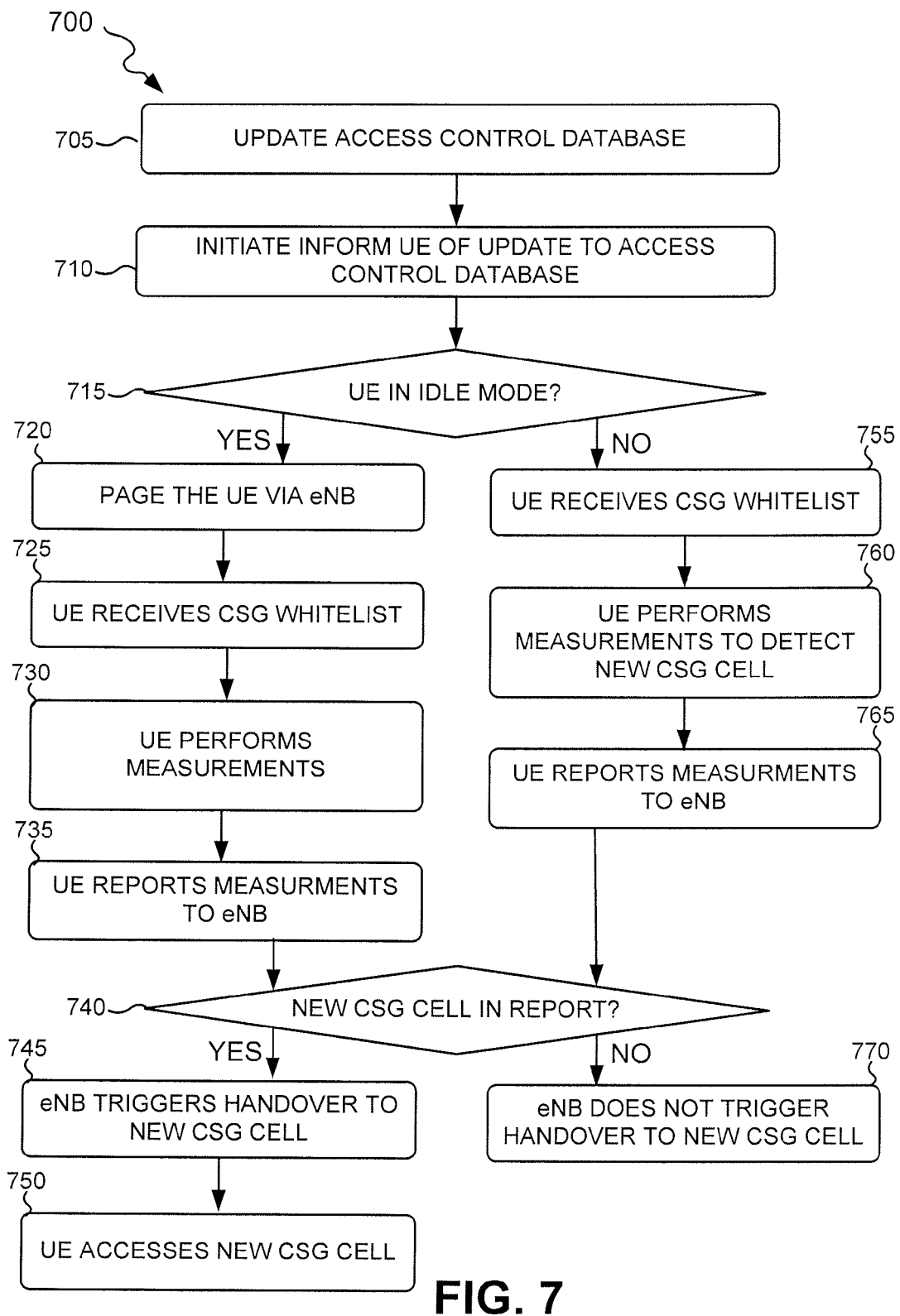

FIG. 7 is a flow diagram illustrating an exemplary process 700 for updating CSG White List 240 in conjunction with a handover procedure.

The ACDB may be updated (block 705). Admin UE 120 may update ACDB 330. For example, the update may include adding and/or removing a particular UE to/from a CSG.

Informing the UE of the update to the ACDB may be initiated (block 710). For example, MME 135 may initiate informing the particular UE of the update based on the update to ACDB 330. That is, the update to ACDB 330 may constitute a triggering event to update CSG White List 240. In one implementation, where the particular UE is not attached to the device (e.g., HeNB 145) in which the updated ACDB 330 resides, the device (e.g., HeNB 145) may inform core network 110 (e.g., the HSS) of the update. For example, when UE 120 attaches to MME 135, some subscription information may be sent from the HSS to MME 135, which may include CSG White List 240 (as a part of the subscription information). In turn, MME 135 may be capable of informing the particular UE of the update. In instances when UE 120 is already attached to the device (e.g., HeNB 145) and HSS information is updated, the HSS may push the updated information to MME 135 that may be serving the particular UE 120.

It may be determined whether the UE is in idle mode (block 715). For example, MME 135 (or, for example, HeNB 145) may determine whether the particular UE is in an idle mode based on the connection state of UE 120. If it is determined that the UE is in idle mode (block 715—YES), then the UE may be paged (block 720). For example, MME 135 may page UE 120, via eNodeBs 125 as normally, to enter a connected mode.

The UE may receive the updated CSG White List (block 725). For example, MME 135 may transmit an updated portion of CSG White List 240 to UE 120. UE 120 may receive and store the updated portion of CSG White List 240. The eNodeB 125 may also be informed about the new CSG cell that UE 120 may access.

The UE may perform measurements (block 730). UE 120 may perform channel estimation operations, cell searching operations, etc. In one implementation, UE 120 may perform one or more of these operations in response to the receipt of the updated portion of CSG White List 240. In other implementations, UE 120 may perform one or more of these operations according to normal operations.

The UE may report the measurements (block 735). UE 120 may report the measurements to eNodeB 125.

It may be determined whether the new CSG cell is in the measurement report (block 740). Since eNodeB 125 has been informed about the new CSG cell, eNodeB 125 may determine whether the new CSG cell is included in the received report. If it is determined that the new CSG cell is in the measurement report (block 740—YES), then a handover to the new CSG cell may be triggered (block 745). ENodeB 125 may initiate handover procedures for handing-over UE 120 to the new CSG cell (e.g., HeNB 145). The UE may then access the new CSG cell (block 750). Once the handover is completed, UE 120 may access the new CSG cell.

Returning to block 715, if it is determined that the UE is not in idle mode (block 715—NO), then the UE may receive the CSG White List (block 755). For example, if UE 120 is already in connected mode, MME 135 may transmit the updated portion of CSG White List 240 to UE 120. UE 120 may receive and store the updated portion of CSG White List 240.

Blocks 760 and 765 may correspond to blocks 730 and 735 previously described.

Returning to block 740, if it is determined that the new CSG cell is not in the measurement report (block 740—NO), then a handover to the new CSG cell may not be triggered (block 770). That is, eNodeB 125 may not initiate handover procedures for handing-over UE 120 to the new CSG cell (e.g., HeNB 145).

Although FIG. 7 illustrates an exemplary process 700, in other implementations, fewer, additional, and/or different operations may be performed.

Figure 8:
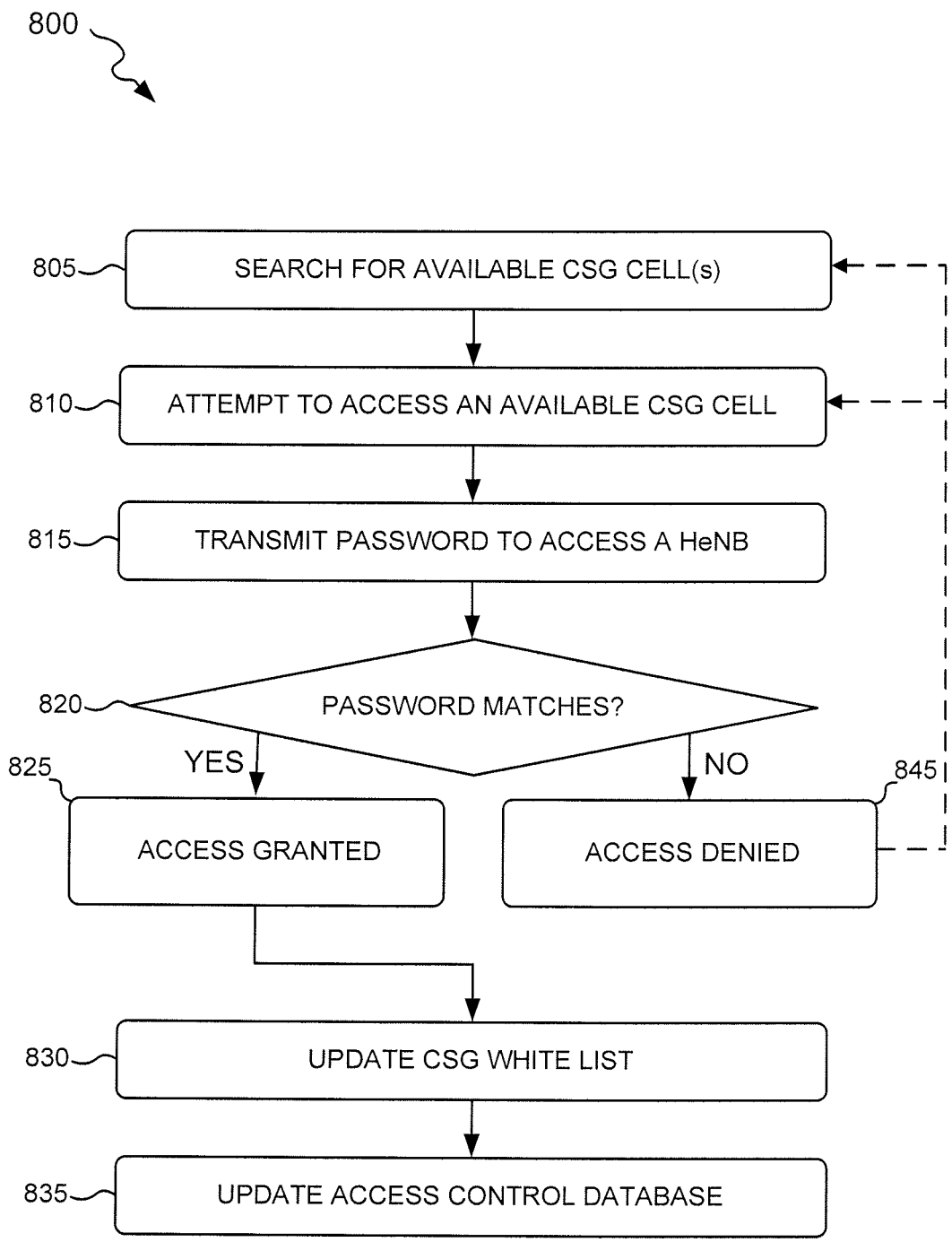
FIG. 8 is a flow diagram illustrating an exemplary process for updating the CSG White List and the ACDB.

FIG. 8 is a flow diagram illustrating an exemplary process 800 for updating ACDB 330 and CSG White List 240. As described in process 800, ACDB 330 may include an additional informational field (e.g., a password field—not illustrated in FIG. 3B.) The password field may store a secret and/or unique password (or some other type of identifier) that may be used for authentication purposes. In one implementation, the password or identifier may be generated, at least in part, based on the HeNB 145 identity (e.g., a medium access control (MAC) address of one of the HeNB 145 backhaul interfaces). Additionally, or alternatively, there may be different types of passwords. For example, there may be a password for administrators and a password for guests or users, which may correspond to admin UE 120 or UE 120, respectively. Process 800 may be performed by UE 120 or admin UE 120.

A search for available CSG cell(s) may be performed (block 805). A user may trigger a search, on UE 120, for all detectable CSG cell(s). It will be appreciated that a detected CSG cell, as a result of the searching, may or may not be included in CSG White List 240, which resides on UE 120.

An attempt to access an available CSG cell may be performed (block 810). UE 120 may determine an available CSG cell(s) based on the search. UE 120 may attempt to access a detected CSG cell.

A password may be transmitted to a HeNB to access the available CSG cell (block 815). For example, UE 120 may transmit a password (or some other type of identifier) in the radio resource control (RRC) signaling towards HeNB 145. The password may be, for example, an administrative-level password, a user-level password, or a guest-level password.

It may be determined whether the transmitted password matches another password (block 820). HeNB 145 may determine whether the transmitted password matches another password stored in ACDB 330. For example, in a core network (CN)-based access control scenario (e.g., where ACDB 330 resides in core network 110, such as MME 135), MME 135 may have knowledge of the IMSI of the attached UE 120. HeNB 145 may transmit the received password and the CSG ID to MME 135. MME 135 may determine whether access should be granted.

In another scenario, such as a RAN-based access control (e.g., where ACDB 330 resides in a RAN), HeNB 145 may not have the IMSI of the attached UE 120. HeNB 145 may use NAS signaling (e.g., an Identity Request) to obtain the IMSI of UE 120. Once the IMSI is obtained, HeNB 145 may determine whether access should be granted.

If it is determined that the password matches (block 820—YES), then access may be granted (block 825). UE 120 may be granted access to the available CSG cell. That is, based on the password matching and corresponding identifier of UE 120, UE 120 may be granted access to an appropriate CSG. The access grant may indicate whether UE 120 corresponds to an administrative level device (i.e., an Admin UE 120) or a non-administrative level device (e.g., UE 120 that may used by users, guests, etc.).

A CSG White List may be updated (block 830) and a ACDB may be updated (block 835). Once UE 120 or admin UE 120 is granted access, CSG White List 240 and ACDB 330 may be updated. For example, when UE 120 corresponds to an admin UE 120, then fields 245 and 250 may be appropriately updated in CSG White List 240. Additionally, fields 335, 340, and 345 may be appropriately updated in ACDB 330. On the other hand, when UE 120 is not an admin UE, then fields 335 and 345 may be updated, as well as field 245.

On the other hand, if it is determined that the password does not match (block 820—NO), then access may be denied (block 845). In this case, UE 120 may return to block 805 or block 810. UE 120 may update CSG White List 240 (e.g., CSG ID) based on the denial, for example, in instances that CSG White List 240 included the denied CSG.

Alternatively, UE 120 may terminate process 800. Although FIG. 8 illustrates an exemplary process 800, in other implementations, fewer, additional, and/or different operations may be performed.

The foregoing description of implementations provides illustration, but is not intended to be exhaustive or to limit the implementations to the precise form disclosed. Modifications and variations are possible in light of the above teachings or may be acquired from practice of the teachings. For example, as previously mentioned, description of processes and/or operations with respect to an LTE communication system may be adapted to other communication platforms. Thus, mention of a particular device (e.g., an MME, etc.) within the description of the embodiments and implementations described herein should not be limited to this particular device. Rather, any operation and/or process described herein may be performed by another device, in addition to, or instead of, the device described. Thus, for example, a device, of a communication platform different than LTE, that provides similar functionality within the different communication platform, may be adapted to perform the processes and/or operations as described herein.

In addition, while series of blocks have been described with regard to the processes illustrated in FIGS. 5A, 5B, 6A, 6B, 7 and 8, the order of the blocks may be modified in other implementations. Further, non-dependent blocks may be performed in parallel. Further one or more blocks may be omitted. It will be appreciated that one or more of the processes and/or operations described herein may be implemented as a computer program. The computer program may be stored on a computer-readable medium (e.g., a memory, a hard disk, a CD, a DVD, etc.) or represented in some other type of medium (e.g., a transmission medium).

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

It should be emphasized that the term "comprises" or "comprising" when used in the specification is taken to specify the presence of stated features, integers, steps, or components but does not preclude the presence or addition of one or more other features, integers, steps, components, or groups thereof.

No element, act, or instruction used in the present application should be construed as critical or essential to the implementations described herein unless explicitly described as such.

The term "may" is used throughout this application and is intended to be interpreted, for example, as "having the potential to," configured to," or "capable of," and not in a mandatory sense (e.g., as "must"). The terms "a" and "an" are intended to be interpreted to include, for example, one or more items. Where only one item is intended, the term "one" or similar language is used. Further, the phrase "based on" is intended to be interpreted to mean, for example, "based, at least in part, on," unless explicitly stated otherwise. The term "and/or" is intended to be interpreted to include any and all combinations of one or more of the associated list items.

What is claimed is:

1. A method performed in a communication system by a device that is communicatively coupled to the communication system, the method comprising:
   receiving an indication that an access control database has been updated, the access control database comprising an administrative level user equipment field;
   performing a power cycle to re-attach to the communication system based on the indication; and
   updating a closed subscriber group (CSG) White List;
   wherein the CSG White List indicates to the device at least one CSG cell the device is allowed to access; and
   wherein the CSG White List is updatable by the device responsive to a CSG cell Tracking Area Update access attempt by the device so as to remove one of the at least one CSG cell corresponding to the CSG cell Tracking Area Update access attempt from the CSG White List when the CSG cell Tracking Area Update access attempt is not successful.

2. The method of claim 1, further comprising:
   receiving an updated portion of the CSG White List from another device.

3. The method of claim 2, wherein the another device comprises a mobility management entity (MME), a mobile switching center (MSC), or a Serving General Packet Radio Service (GPRS) Support Node (SGSN).

4. The method of claim 1, wherein the device comprises a user equipment and the at least one CSG cell comprises at least one femto cell.

5. A method performed in a communication system that includes at least one closed subscriber group (CSG) cell, the method comprising:
   updating an access control database that specifies which of at least one user equipment is allowed to access the at least one CSG cell, the access control database comprising an administrative level user equipment field;
   informing a device, which is communicatively coupled to one of the at least one user equipment to which the updating of the access control database pertains of the updating of the access control database, wherein the device performs a power-cycle to re-attach to the communication system based on the informing of the updating, and
   providing a CSG White List to the one of the at least one user equipment;
   wherein the CSG White List indicates to the one of the at least one user equipment the at least one CSG cell that the one of the at least one user equipment is allowed to access; and
   wherein the CSG White List is updatable by the device responsive to a CSG cell Tracking Area Update access attempt by the device so as to remove one of the at least one CSG cell corresponding to the CSG cell Tracking Area Update access attempt from the CSG White List when the CSG cell Tracking Area Update access attempt is not successful.

6. The method of claim 5, where the providing comprises:
   determining whether the one of the at least one user equipment is in an idle mode; and
   paging the one of the at least one user equipment if the one of the at least one user equipment is determined to be in the idle mode.

7. The method of claim 5, where the providing comprises:
   providing the CSG White List in a non-access stratum (NAS) message.

8. A device capable of operating in a communication system, comprising:
   a processing system configured to:
      receive an indication that an access control database has been updated, the access control database comprising an administrative level user equipment field;
      perform a power cycle to re-attach to the communication system based on the indication; and
      update a closed subscriber group (CSG) White List;
      wherein the CSG White List indicates to the device at least one CSG cell the device is allowed to access; and
      wherein the CSG White List is updatable by the device responsive to a CSG cell Tracking Area Update access attempt by the device so as to remove one of the at least one CSG cell corresponding to the CSG cell Tracking Area Update access attempt from the CSG White List when the CSG cell Tracking Area Update access attempt is not successful.

9. The device of claim 8, wherein the device comprises a user equipment and the at least one CSG cell comprises at least one femto cell.

10. The device of claim 8, wherein the CSG White List is automatically received from the communication system during the re-attaching.

11. The device of claim 10, wherein the device comprises a second CSG White List and the received CSG White List is an updated version of the second CSG White List of the device.

12. A device capable of operating in a communication system having at least one closed subscriber group (CSG) cell, the device comprising:

a processing system configured to:
  receive an indication that an access control database has been updated, the access control database comprising an administrative level user equipment field, where the access control database specifies which of at least one user equipment is allowed to access the at least one CSG cell;
  determine to which of the at least one user equipment that the updated access control database pertains; and
  inform a device, which is communicatively coupled to one of the at least one user equipment to which the updating of the access control database pertains of the updating of the access control database, wherein the device performs a power-cycle to re-attach to the communication system based on the informing of the updating;
  deliver an updated CSG White List to the determined at least one user equipment, where the updated CSG White List indicates to the determined at least one user equipment which of the at least one CSG cell the determined at least one user equipment is allowed to access;

wherein the CSG White List is updatable by the at least one user equipment responsive to a CSG cell Tracking Area Update access attempt by the at least one user equipment so as to remove one of the at least one CSG cell corresponding to the CSG cell Tracking Area Update access attempt from the CSG White List when the CSG cell Tracking Area Update access attempt is not successful.

13. The device of claim 12, where the device comprises a mobility management entity (MME).

14. The device of claim 12, where the processing system is further configured to:
  page the determined at least one user equipment before delivering the updated CSG White List when the determined at least one user equipment is determined to be in an idle mode.

15. The device of claim 12, where the updated CSG White List is delivered in a non-access stratum (NAS) message.

* * * * *